United States Patent [19]

Friedman et al.

[11] Patent Number: 5,005,647

[45] Date of Patent: Apr. 9, 1991

[54] TREATING UNDERGROUND FORMATIONS

[75] Inventors: Robert H. Friedman; Billy W. Surles, both of Houston, Tex.

[73] Assignee: Texaco Inc., White Plains, N.Y.

[21] Appl. No.: 459,608

[22] Filed: Jan. 2, 1990

[51] Int. Cl.$^5$ .................... E21B 33/134; E21B 33/138
[52] U.S. Cl. .................................... 166/295; 166/300; 523/130
[58] Field of Search ............... 166/288, 294, 295, 300, 166/272, 303; 523/130

[56] References Cited

U.S. PATENT DOCUMENTS

| | | | |
|---|---|---|---|
| 2,513,614 | 7/1950 | Barkhuff, Jr. | 166/295 |
| 3,126,959 | 3/1964 | Ortloff | 166/295 X |
| 3,785,437 | 1/1974 | Clampitt et al. | 166/295 X |
| 4,070,865 | 1/1978 | McLaughlin | 166/295 X |
| 4,091,868 | 5/1978 | Kozlowski et al. | 166/295 X |
| 4,312,605 | 1/1982 | Clarke | 166/295 X |
| 4,402,633 | 9/1983 | Self | 166/295 |
| 4,512,407 | 4/1985 | Friedman | 166/295 |
| 4,817,721 | 4/1989 | Pober | 166/295 |
| 4,842,072 | 6/1989 | Friedman et al. | 166/300 X |
| 4,903,770 | 2/1990 | Friedman et al. | 166/288 |

*Primary Examiner*—George A. Suchfield
*Attorney, Agent, or Firm*—Jack H. Park; Kenneth R. Priem

[57] ABSTRACT

Wells penetrating oil-producing and water-producing intervals may be treated in order to reduce the flow rate of water into the well by isolating the water-producing interval and introducing into it a volume of treating fluids sufficient to invade at least six inches into the water-producing interval. Cased wells may be treated to plug holes in the casing caused by corrosion or casing breaks by introducing a treating fluid into the formation adjacent to the break. The treating fluid comprises a material which can be acid catalyzed in a period of from 1 to 16 hours at formation conditions, preferably a monomer or oligomer of furfuryl alcohol. The treating fluid contains from 40 to 60 percent furfuryl alcohol and from 40 to 60 percent of an ester, preferably ethyl acetate or butyl acetate. The catalyst is preferably orthonitrobenzoic acid or toluene sulfonic acid in a concentration of from 1 to 4 percent by weight, selected to produce a set time at the formation temperature in the range of from 1 to 16 hours. The treating fluid also contains an effective amount in the range of 0.5 to 1.5 percent of a water swelling polymer, preferably a copolymer of starch and synthetic polymer (acrylates or acrylamides) to prevent shrinkage of the furfuryl alcohol on polymerization.

26 Claims, No Drawings

TREATING UNDERGROUND FORMATIONS

CROSS-REFERENCE TO RELATED APPLICATIONS

This application is related to copending application Ser. No. 07/459,606 filed Jan. 2, 1990 "TREATING UNDERGROUND FORMATIONS", and Ser. No. 07,459,609 filed Jan 2, 1990 for "SAND CONTROL METHODS."

FIELD OF THE INVENTION

This invention relates to methods for treating subterranean earth formations. More particularly, this invention pertains to methods for treating wells completed in subterranean formations to form an impermeable plug where needed. In one example the plug is used to reduce the permeability of a water-producing interval in an oil well to reduce the flow of water into a well which is producing oil from other intervals. In another embodiment the method is applied to form a closure in holes or leaks in well casing.

BACKGROUND OF THE INVENTION

When subterranean petroleum deposits are located, the current field practice comprises penetrating the formation with a well, and providing flow conduit in the well and establishing fluid communication between the inside of the flow conduit and the petroleum-containing layers or intervals of the formation by perforating the well casing, in order to permit the petroleum to flow into the well so it may be pumped to the surface of the earth. Many subterranean, petroleum containing reservoirs are comprised of a plurality of strata or separate earth formations, and it is not unusual for a producing well to be in contact with one or more separate intervals from which petroleum is recovered and also be in contact with one or more intervals from which water is produced from the formation. Even in the early stages of primary production, some water-production is not uncommon because of these naturally-occurring earth strata which have water present in the pore spaces thereof. Many petroleum formations overlie and contact an active aquifier, and production of large volumes of water from the underlying Aquifier is a common result in such instances. Even though the intention at the time the well is completed is to perforate the well casing so communication between the well and formation is established only in the intervals where oil production may be expected, some water production is encountered even in the early stages of oil production. Moreover, the dynamics of production activities sometime results in an increase in the amount of water being produced from certain intervals. Even if the oil-production volume remains constant, the ratio of water to oil often increases with time as production is continued from a well, until the amount of water being produced is too great to allow continued production from the well because of the cost of producing and disposing of large volumes of water recovered from the well.

Another problem frequently encountered in wells including oil wells completed in earth formations concerns leaks which sometimes develop between the well interior and the formation. Oil wells are usually completed with a steel casing lining the well, and holes sometime develop in the casing which allows undesired passage of fluid between the well and the formation. Leaks in casing can result from corrosion, shifts in earth formation, or because of failure in the cement used when installing the casing at the time the well was drilled. Any of these occurrences can result in passage of fluid from the formation into the well, which interferes with oil production, or passage of fluid from the well into earth formations, which can result in loss of oil or pollution of water zones or both.

Modern logging techniques widely available in the field allow accurate determination and location of the zones which are producing oil and zones which are producing water. Many techniques have been attempted in field operations, and used commercially with limited success, for the purpose of reducing the permeability of the zones which are producing water, in order to allow continued production of oil from a well while reducing the volume of water production.

One of the oldest techniques employed for this purpose involves the injection of liquid portland cement into a permeable formation, followed by shutting in the well for a period of time sufficient to allow the cement to set, thereby rendering the formation so treated substantially fluid impermeable. This same technique has also been applied for the purpose of plugging holes in well casing. While this technique has enjoyed limited success in certain applications, oil field cement cannot be used successfully if the temperature of the formation where the process is being applied exceeds about 200° F. because the high temperature causes dehydration of the cement and results in the formation of a very weak plug. The rapid deterioration of the cement plugged zone, due to high temperature, renders this technique unsuitable for treating high temperature wells. Susceptibility of cement to high pH similarly makes cement plugging unsuitable for use in wells in an oil formation being stimulated by injection of fluids having relatively high pH.

U.S. Pat. No. 4,328,864 issued May 11, 1982 for "METHODS FOR RECOVERY OF OIL" discloses a method of plugging a water producing interval by using a water swelling polymer which is a copolymer starch and synthetic (acrylamides and acrylates). This method is quite effective in low temperature environments but cannot be used if the formation temperature exceeds 200° F.

More recently, improved processes have become available employing a plastic or resin treating technique wherein a resinous material is injected into the formation and allowed to set, thereby reducing the permeability of the treated zone. This technique makes use of urea formaldehyde resins, and is more successful than cement but is still not useful when the formation temperature exceeds about 200° F. Urea formaldehyde resins are prone to autocatalysis at high temperatures, and so the set time of the injected resin is so short that the treating fluid cannot efficiently invade the zone where the treatment is to be applied.

Other methods have been proposed for use in treating water-producing intervals, employing two or more separate fluids which are injected sequentially with the hope that they will mix after injection into the formation, causing the formation of a solid material in the flow channels so treated, thus reducing the permeability of the treated portion of the formation. This has not been particularly successful in actual use, however, because it is difficult to achieve the degree of mixing between the two fluids necessary in order to form a uniformly reacted solid material necessary to achieve successful plugging of water-producing intervals.

Another type of process has been employed with limited success using an aqueous solution of a hydrophilic polymer injected sequentially with aqueous solutions of materials which promote cross-linking between the polymer molecules, which gradually increases the amount of polymers absorbed on the mineral surfaces of the formation and ultimately reduces the permeability of the zones. These procedures are expensive and time consuming and have not always produced satisfactory results.

We have disclosed previously in copending application Ser. No. 07/459,606 a method for plugging wells using a treating fluid containing a monomer or oligomer of furfuryl alcohol which can be made to polymerize in a zone in an earth formation to form an impermeable plug. This technique is usually successful despite a slight tendency for furfuryl alcohol to shrink after completion of polymerization in the formation. Sometimes, however, this shrinkage causes cracks in the polymerized mass or causes poor adhesion to the casing or formation. In extreme cases, failure of the plug can occur as a result of shrinkage-induced fractures.

It can be seen from the foregoing discussion that there is still a substantial, unfulfilled need for an inexpensive, simple and reliable procedure which can be applied to formations whose temperatures are greater than 200° F., in order to eliminates the flow of water from water-producing intervals into a well penetrating the formation, or for plugging breaks or holes in well casing, using a polymerizable composition in which no shrinkage occurs after polymerization of the monomer or oligomer.

SUMMARY OF THE INVENTION

One embodiment of our invention concerns methods for treating subterranean earth formations penetrated by a well which is in fluid communication with at least one water-producing earth strata and at least one oil-producing earth strata. In another embodiment, our invention concerns methods for treating wells to plug holes in well casing caused by corrosion, mechanical stress or thermal stress or the like. The casing break or the water producing strata is located and isolated by mechanical means. A quality of treating fluid is prepared containing a monomer or oligomer which can be acid catalyzed in a period of from 30 to 960 minutes at the formation temperature by an internal acid catalyst. Our preferred treating fluid contains from 40 to 60 percent of an oligomer of furfuryl alcohol. The slug or quantity of treating fluid also contains from 40 to 60 percent of an ester, preferably ethyl acetate or butyl acetate which serves as both a diluent and as an additive to absorb water and ensure completion of the polymerization reaction. The treating fluid also contains from 1 to 4 percent of an effective acid catalyst such as orthonitrobenzoic acid or toluene sulfonic acid. The concentration and choice of acid catalyst is crucial in achieving success with our process. The concentration and strength of the acid catalyst will determine the set time, which is critical in achieving the proper depth and uniformity of invasion of the interval being treated with the treating fluid, which is required to accomplish effective shut-off of the water or closure of the casing. Orthonitrobenzoic acid is preferred if the temperature is greater than 250° F. or if the permeability of the formation is very low. Toluene sulfonic acid is the preferred catalyst when the temperature is less than 250° F.

We have discovered that the tendency for furfuryl alcohol resins to shrink on hardening can be greatly reduced or essentially eliminated by incorporating a polymer which swells when it absorbs water, into the treating fluid containing the furfuryl alcohol monomer or oligomer, ester and acid. The preferred polymer is one which is capable of absorbing up to 1300 times its weight in water. The particularly preferred polymer is a copolymer of starch and synthetic polymers (acrylamides and acrylates). The effective concentration of water swelling polymer for our application is from 0.5 to 1.5 and preferably from 0.9 to 0.11 percent by weight.

The treating composition is introduced into the well and allowed to flow under the influence of its own hydrostatic pressure into the zone being treated. The treating fluid can be displaced from the wellbore with diesel oil or some other relatively inert material, or the material may be left in the wellbore and drilled out after the injected treating fluid has solidified. Because the presence of the swellable polymer, essentially no shrinkage of the polymerized furfuryl alcohol occurs.

DESCRIPTION OF THE PREFERRED EMBODIMENT

We have discovered methods for treating subterranean earth formations which can be used in several embodiments. One application is applied to a well in fluid communication with at least one earth layer that produces oil and at least one earth layer which produces water. In this situation, our process is used to treat the interval which produces water to reduce the permeability of the treated interval so as to reduce the flow of water into an oil-producing well. The reaction which causes the permeability reduction or plugging is not selective, so it is necessary to isolate the water-producing interval from the oil-producing interval; however, the reaction produces a solid matrix which is very durable and long-lasting, and which is resistant to high temperatures encountered in many petroleum reservoirs as well as alkaline fluids sometimes employed in petroleum stimulation processes.

In another embodiment, our process is applied to a cased well to close or plug a hole that has developed as a result of corrosion or mechanical stress such as earth movement, which is causing leakage of fluids in or out of the well. The same treatment process is applied in this case to force a fluid into the hole in the casing and a short distance into the formation. The injected treating fluid sets to a tough, impermeable plug. Any residual set polymer inside the casing can be drilled out, resulting in a permanent closure of the hole in the casing which will allow resumption of operations in the well.

Our method employs a fluid containing as a major component a substance which is catalyzed by the presence of an acidic material to polymerize into a rigid solid mass which occupies the pore spaces of the portion of the formation in which the treating fluid is introduced, thereby plugging the treated zone. Our especially preferred polymerizable material is an oligomer of furfuryl alcohol. One particularly preferred commercially available material for this purpose is QUACOR 1300 ® sold by Q. O. Chemicals.

We have found that the furfuryl alcohol monomer or oligomer used in accordance with the foregoing, polymerizes to form an effective impermeable mass which restrains fluid flow into the formation and exhibits sufficient strength and durability for most applications despite the fact that some shrinkage usually is observed during hardening or polymerization of furfuryl alcohol after it has been placed in the formation. Occasionally, however, the shrinkage of furfuryl alcohol causes problems such as formation of cracks in the resin treated zone around the well, which in extreme cases may lead to early failure of the plug formed in the well to reduce water flow or to plug casing holes.

We have found that shrinkage of furfuryl alcohol on polymerizing and curing can be greatly reduced or eliminated by incorporating a special water swellable polymer in the treating composition comprising the monomer or oligomer of furfuryl alcohol, ester and catalyst.

For our application, "water swelling polymer" is intended to mean a polymeric composition which, upon contact with fresh water, will swell to hundreds of times its normal weight, desirably about 1300 times its normal weight, or more. By "normal weight" is meant the weight of the polymer in its original unswollen state.

One polymer which is suitable for use as the "swelling polymer" of this invention is SGP 5025 ®, which is a copolymer of starch and synthetics (acrylamides and acrylates) manufactured by Henkel Corporation, Minneapolis, Minnesota, U.S.A. The acrylic portion of the copolymer renders it insoluble in water, yet the starch portion imparts high water affinity. Upon contact with fresh water or mildly saline water, this polymer will swell to approximately 1300 times its original weight.

The concentration of water swelling polymer for use in our invention is from 0.5 to 1.5 and preferable from 0.9 to 1.1 percent by weight. In this application, percent refers to the weight of the dry, unswollen polymer as a percent of the weight of the treating fluid as described therein.

In protecting the process of our invention, a quantity of treating fluid is prepared containing from 40 to 60 percent of the furfuryl alcohol oligomer. The treating fluid also contains from 40 to 60 percent of an ester, and our preferred ester is ethyl acetate or butyl acetate. The fluid also contains an effective amount of acid catalyst, and the choice of acid and the concentration of acid employed in the treating fluid is determined to a large extent by the down-hole temperature of the formation being treated and by the permeability of the formation. It is desired that the set time, i.e. the time from formulation of the fluid until it is introduced into the formation and begins to polymerize to form the plastic or solid mass which occupies the pore spaces of the treated interval of the formation, should be sufficient so the treating fluid will leak or flow from the wellbore into which the fluid is introduced, through the perforations or hole in the casing and into the permeable earth formation immediately adjacent to the well before the polymerization has progressed to a point that flow no longer can occur. If the set time is too great, excessive leakage of the fluid will occur, and the fluid will not be confined to the immediate vicinity of the wellbore and so an effective treatment will not be achieved. If the set time is too low, the injected fluid will not penetrate the porous formation to the extent desired, and so a successful and durable job will not be accomplished. Since the reaction rate is approximately first order dependent upon temperature, care must be taken in using the acid catalyst and in selecting the proper concentration of acid catalyst, in order to achieve a set time in the desired range of from 1 to 16 hours. It is strongly preferred that the temperature in the zone where the treatment is to be applied be measured carefully just prior to applying the treatment. If the formation temperature is less than about 250° F., our preferred catalyst is toluene sulfonic acid. At temperatures greater than 250° F., the preferred acid catalyst is orthonitrobenzoic acid.

The permeability of the formation should also be taken into consideration in selecting the desired set time of the fluid employed in the process of our invention, which means that the permeability influences the choice of acid catalyst and the concentration of catalyst employed in our treating fluid. The Table below gives a general guideline for selection of acid and concentration at various combinations of permeability and formation temperature.

TABLE 1

| Temperature | Acid | Concentration |
|---|---|---|
| | 100 MILLIDARCIES–500 MILLIDARCIES | |
| 100–250° F. | Toluene Sulfonic Acid | 1 to 4 |
| Over 250° F. | 0-Nitrobenzoic Acid | 1 to 2 |
| | .500 DARCIES–1.5 DARCIES | |
| 100.–250° F. | Toluene Sulfonic Acid | 1 to 4 |
| Over 250° F. | 0-Nitrobenzoic Acid | 1 to 2 |
| | OVER 1.5 DARCIES | |
| 100–250° F. | Toluene Sulfonic Acid | 1 to 4 |
| Over 250° F. | 0-Nitrobenzoic Acid | 1 to 2 |

The volume of treating fluid employed in our process should be enough to treat the formation for about 1 to 2 inches from the wall of the wellbore into the formation. As a quick guideline, a volume of fluid equal to two times the volume required to fill the tubing in the perforated interval to be treated with our process may be employed. This will allow for adequate penetration of the permeable formation with a treating fluid, and may leave enough of the treating fluid in the well to require that the residual hardened polymer be drilled out after completion of the reaction.

Ordinarily, the time required for the injected treating fluid to react to a point that it will no longer flow away from the well may be in the range of from 1 to 16 hours, although polymerization will continue for some time after this initial stable condition is reached. It is preferred that the well be allowed to set without any further activity for a period of from 1 to 3 days in order to ensure that the maximum strength of the polymerized furfuryl alcohol oligomer has been achieved, so no damage will be done to the treated zone which might allow resumption of fluid flow through the treated zone.

In its broadest aspect, the process of our invention comprises preparing a quantity of treating fluid containing the oligomer of furfuryl alcohol, the ester, the acid catalyst, and as the shrinkage reducing additive, the water swelling polymer, the copolymer of starch and acrylic. The treating fluid is placed in the well adjacent to perforations connecting the wellbore with the water producing interval of the formation or adjacent to the casing break. The hydrostatic pressure of the fluid in the well causes the treating fluid to pass through the perforation or hole in the casing into the permeable formation, where it solidifies to form an impermeable plug.

One alternative embodiment of the process of our invention involves injecting a fluid to further displace the treating fluid from the wellbore into the interval of the formation being treated. Field brine or water may be used for this process, or diesel oil may be used. This reduces or eliminates the need for drilling out the residual solidified polymer after the treating fluid has set, and accomplishes somewhat greater in-depth penetration of the treating fluid into the formation. In applying this embodiment of the process of our invention, a volume of post-flush fluid, e.g. water, brine or diesel oil, about equal to the volume of the portion of the wellbore adjacent to perforations is introduced into the wellbore is used so it will displace the treating fluid into the water-producing interval.

Another alternative embodiment of the process of our invention is especially preferred when the formation permeability is so high that it is difficult to achieve uniform treatment of the water-producing interval by simply adjusting the set time so as to ensure that the fluid invades just the proper amount of formation prior to solidifying to the point of further movement does not occur. In this instance, a material is added to the treating fluid to increase the viscosity of the fluid sufficiently that it will not move away from the wellbore so fast that the injected fluid fails to properly saturate the formation interval adjacent to the wellbore. For this purpose, any colloidal material can be added to the treating fluid, and if desired, it is only necessary that the first portion of the treating fluid introduced into the wellbore contain the colloidal material. Starch such as that commonly sold and employed in drilling fluids is a very effective colloidal substance for this purpose, as is colloidal silica flour. For our purpose, the flow rate of the treating fluid into a high permeability zone is adequately controlled if the treating fluid contains from 10 to 30 percent by weight of the colloidal substance employed for this purpose.

FIELD EXAMPLE

An oil-production well in the Sour Lake field in Texas was producing water and oil with a water/oil ratio of >100 and it was decided to apply the process of our invention to reduce the permeability and therefore the flow rate of water from the water-producing interval. Since the temperature of the oil-producing interval penetrated by this well was about 300° F., neither a cement squeeze nor a treatment with urea formaldehyde resin as is commonly available for this purpose was thought to be a satisfactory solution. The oil-producing zone was under the water-producing zone, so it was necessary to locate the boundary between these two zones and isolate one from the other with a bridge plug set into the well. A total of five barrels of a resin mixture was prepared for the purpose of treating this well. The resin mixture comprised 60% QUACOR 1300 Furan Resin ®, and oligomer of furfuryl alcohol, 39 percent ethyl acetate and one percent orthonitrobenzoic acid. This quantity of treating fluid was introduced into the well and allowed to flow down into the bottom of the well as far as the bridge plug by gravity, and then to leak off into the water-producing interval. Since the density of the treating fluid was slightly greater than the density of water, the fluid displaced water in the water-producing interval with no additional pressure being applied to the treating fluid. The set time of this treating fluid was about six hours, and it was subsequently determined that this was somewhat excessive and allowed the fluid to leak off from the well too rapidly. Although appreciable plugging occurred in this well, it was recognized that the procedure would be improved if toluene sulfonic acid were used instead of orthonitrobenzoic acid, in order to reduce the set time of the treating fluid.

PILOT FIELD EXAMPLE

For purpose of additional disclosure, including what we consider to be the preferred embodiment of the process of the present invention, the following pilot example is offered.

An oil well penetrating a thirty foot oil-producing interval over which is a 40 foot water-producing interval is producing a fluid mixture of oil and water with the water-oil ratio being about 90, at which point the cost of producing and disposing of the excess water may soon require that the well be shut-in or treated to reduce the water flow. The formation temperature is 230° F. The well casing perforations have established communication with both the oil zone and the water zone, so a bridge plug is set at the boundary between the oil and water-producing interval. It is desired to introduce sufficient fluid into the well so the gravity flow of treating fluid into the formation causes at least a six inch zone adjacent to the well casing to be saturated with the treating fluid. It is thus necessary to introduce a quantity of fluid sufficient to fill the well casing up to the top of the perforations in the water-filled zone and to invade the pore spaces of the water-producing interval for a distance of at least six inches. The wellbore diameter is ten inches, so the volume required to fill the wellbore is $$\pi \frac{(10)^2}{(12 \times 2)} (40) = 21.81 \text{ cu. ft.}$$

The volume required to saturate the pore spaces of the formation, whose porosity is 35 percent, for a distance equal to 5 inches beyond the perforations is equal to $$(0.35)(40)\left[\frac{(10+5)^2}{(2\times 12)} \times (40) - \pi\frac{(10)^2}{(2\times 12)}\right] = 22.91 \text{ cu. ft.}$$

The total volume to fill the casing and saturate the formation is 21.81+22.91=44.72 cu. ft. or 334 gallons.

A total of 334 gallons of treating fluid is prepared for this operation, which is comprised of sixty percent QUACOR 1300 ®, 39 percent ethyl acetate and one percent toluene benzene sulfonic acid. This fluid also contains 1 percent by weight of Waterlon A 200 ® sold by Gasin Processing Co., a copolymer of starch and acrylic, to reduce shrinkage of the furfuryl alcohol during polymerization. This treating fluid is introduced into the wellbore and allowed to migrate under its own pressure into the water-producing interval in the formation. The set time for this fluid at the formation temperature of 200° F. is about 6 hours. The treating fluid is allowed to stand in the well for 3 days to ensure that its maximum strength has been obtained before the remaining residual material is drilled out and the well is placed back on production. After the above treatment, the water-production has dropped to 2 barrels per day resulting in a total water-oil ratio of 15, a significant improvement over the condition prior to the application of our process. No evidence of shrinkage of the polymerized furfuryl alcohol is detected.

While our invention has been described in terms of a number of illustrative embodiments, it is clearly not so limited as many variations thereof will become apparent to persons skilled in the art without departing from the spirit and scope of our invention. It is our intention that our invention be limited only by the limitations in the claims appended immediately hereinafter below.

We claim:

1. A method for treating a subterranean permeable formation penetrated by a well in fluid communication with at least a portion of the formation to form an impermeable zone in the formation comprising introducing into the formation an effective amount of a treating fluid comprising a monomer or oligomer which can be acid catalyzed at the formation temperature to polymerize in the flow channels of the formation, said treating fluid also containing an ester and an effective amount of an acid catalyst, and an effective amount of a water swelling polymer to reduce shrinkage of the monomer or oligomer during polymerization.

2. A method as recited in claim 1, wherein the polymerizable component of the treating fluid comprises an oligomer of furfuryl alcohol.

3. A method as recited in claim 2, wherein the concentration of the oligomer of furfuryl alcohol is from 40 to 60 percent by volume of the treating fluid.

4. A method as recited in claim 1, wherein the ester is ethyl acetate or butyl acetate.

5. A method as recited in claim 4, wherein the ester is ethyl acetate.

6. A method as recited in claim 4 wherein the ester is butyl acetate.

7. A method as recited in claim 1, wherein the acid catalyst is orthonitrobenzoic acid or toluene sulfonic acid.

8. A method as recited in claim 7 wherein the acid catalyst is orthonitrobenzoic acid.

9. A method as recited in claim 7 wherein the acid catalyst is toluene sulfonic acid.

10. A method as recited in claim 1 wherein the concentration of the acid catalyst is from 1 to 4 percent.

11. A method as recited in claim 10 wherein the concentration of the acid catalyst is selected to cause the treating fluid to have a set time of from 1 to 16 hours.

12. A method as recited in claim 10 wherein the concentration of the acid catalyst is selected to cause the treating fluid to have a set time of from 1 to 6 hours.

13. A method as recited in claim 1, wherein the well penetrates a water-producing interval located above an oil-producing interval, comprising the additional step of setting a bridge plug in the well prior to introducing the treating fluid into the water-producing interval.

14. A method as recited in claim 1 wherein the water swelling polymer is a polymeric composition which upon contact with fresh water will swell to 1300 times its normal weight.

15. A method as recited in claim 14, wherein the water swelling polymer is a copolymer of starch and a synthetic resin.

16. A method as recited in claim 15, wherein the water swelling polymer is a copolymer of starch and a synthetic polymer selected from the group consisting of acrylamides, acrylates and mixtures thereof.

17. A method as recited in claim 1, wherein the concentration of swelling polymer is from 0.5 to 1.5 percent of the treating fluid.

18. A method as recited in claim 1, wherein the concentration of swelling polymer is from 0.9 to 1.1 percent of the treating fluid.

19. A method as recited in claim 1, wherein a fluid is introduced after introduction of the treating fluid to displace the treating fluid into the flow channels of the water-producing interval.

20. A method as recited in claim 19 wherein the fluid is water.

21. A method as recited in claim 20 wherein the fluid is diesel oil.

22. A method as recited in claim 1, wherein the treating fluid also contains an effective amount of colloidal material sufficient to increase the viscosity of the treating fluid in order to reduce the rate in which the fluid moves from the wellbore into the water-producing interval of the formation.

23. A method as recited in claim 22 wherein the colloidal material is starch.

24. A method as recited in claim 22 wherein the colloidal material is silica flour.

25. A method as recited in claim 1, wherein the well is cased and the casing has an undesired hole therein, and the process is applied to plug the casing hole.

26. A method as recited in claim 1, wherein the well is in fluid communication with an oil producing interval and a water producing interval, comprising isolating the water producing interval from the oil producing interval and introducing the treating fluid only into the water producing interval to reduce the water production therefrom.

* * * * *